Oct. 12, 1954    E. A. LARSSON    2,691,701
CURRENT COLLECTOR
Filed Dec. 2, 1948
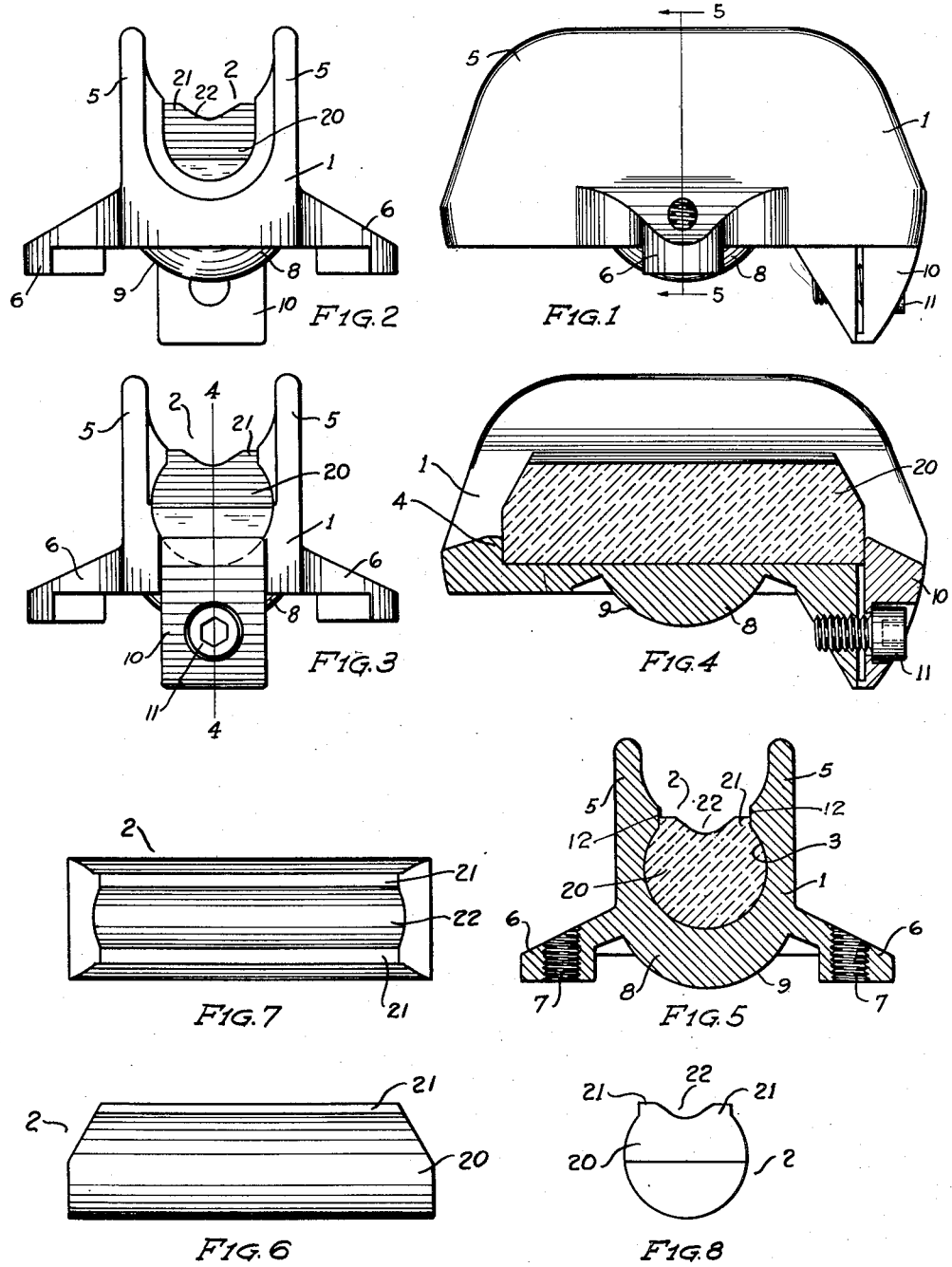
INVENTOR.
ERNST A. LARSSON
BY Patented Oct. 12, 1954

2,691,701

UNITED STATES PATENT OFFICE 2,691,701

CURRENT COLLECTOR

Ernst A. Larsson, Mansfield, Ohio, assignor to The Ohio Brass Company, Mansfield, Ohio, a corporation of New Jersey Application December 2, 1948, Serial No. 63,171

4 Claims. (Cl. 191—59.1)

My invention relates to current collectors or heads for electrically operated vehicles and has particular reference to the insert or that portion of a current collector or head which engages with the trolley wire and the support or holder for the insert.

The object of my invention is to provide an insert and a holder therefor which are easily and quickly and securely mounted on a trolley harp or support for the holder and in which the insert is quickly and easily replaced when worn out.

Other objects and advantages will be apparent from the following disclosure and drawing pertaining to my invention.

In the drawing—

Fig. 1 is a side elevation of the holder forming a part of my invention.

Fig. 2 is an end view of Fig. 1 showing a portion of the insert.

Fig. 3 is another end view of Fig. 1 also showing a portion of the insert.

Fig. 4 is a vertical longitudinal view in partial section on the line 4—4 of Fig. 3.

Fig. 5 is a transverse sectional view on the line 5—5 of Fig. 1.

Figs. 6, 7 and 8 are side, top and end views respectively of my improved insert.

The holder 1 for the insert 2 comprises a metallic body with a longitudinal bore 3 open along the top side with a stop 4 at one end. Projecting upwardly from the portion forming the bore 3 are longitudinal flanges 5—5.

Projecting laterally from the holder and forming a part thereof are lugs 6—6 with threaded openings 7—7 by means of which the holder is securely mounted on a harp (not shown see U. S. Patent 2,185,269).

The body is also provided with a projection 8 having a spherical bearing surface 9 which engages a spherical cup shaped support member on the head (see above patent).

The holder 1 is provided at the open end opposite the stop 4 with a separately formed clamp member 10 held in place by the socket headed screw 11.

Mounted in the bore 3 is the insert 2 which may be formed of a carbonaceous material plain or impregnated with a molten metal (U. S. Patent 2,169,154) or a mix of graphite and a powdered metal or an insert in which the powdered metal is sintered.

The insert is provided with an elongated portion 20 having a curved contact or bearing surface almost complete in transverse cross-section with two projecting spaced flanges 21 extending along the portion 20 and a longitudinal groove 22 paralleling the flanges and positioned between the flanges to receive the trolley wire.

The diameter of the circular portion of the insert is substantially that of the bore 3 of the holder and when inserted endwise into the bore 3 one end bears against the fixed stop 4 and when the clamp member 10 is positioned as shown it engages the opposite end of the insert thus securing the insert in position in the holder against longitudinal displacement.

The holder is provided with two longitudinal ribs 12 extending along the open edges of the bore 3 and so positioned as to engage the flanges 21 on the insert thus providing means preventing rotation of the insert relative to the holder.

The opening between the ribs 12 is less than the maximum diameter of the portion 20 whereby the flanges overlap the insert thereby preventing removal of the insert transversely of the holder.

The flanges 5 retain the current collector or head in position relative to the trolley wire.

The insert has a slightly sliding fit with respect to the surface of the bore 3 although this is not necessary as the contact surfaces on the holder and insert are ample.

Having described my invention, I claim:

1. A current collector insert of frangible conducting material which in use supports loads only in compression and which under stress has substantially increased resistance to cracking and breakage and tends to close its longitudinal cracks, which comprises an elongated body of frangible conducting material having a longitudinal groove in one portion of its surface to receive and support a trolley wire as the collector moves along the right-of-way, and an elongated transversely curved convex surface opposite to said groove and engageable with a mating surface of a support member, said insert serving to absorb forces received from said wire and to distribute them to the convex surface at angles to a longitudinal diametrical plane through the bottom of the groove.

2. A current collector insert of frangible conducting material which in use supports loads only in compression and which under stress has substantially increased resistance to cracking and breakage and tends to close its longitudinal cracks, which comprises an elongated body of frangible conducting material having a longitudinal groove in one portion of its surface to receive and support a trolley wire as the collector moves along the right-of-way, and an elongated bearing area on another portion of the body surface centered substantially diametrically opposite said groove, said bearing area being convexly curved through an arc of more than 180 degrees transversely of the insert body to engage and be supported by a mating bearing area of a support member, and said groove being within the projection of the bearing surface arc and having a trolley-wire-engaging floor portion concavely curved transversely of the said body.

3. A substantially straight, elongated, solid current collector insert of frangible material having a longitudinally extending, trolley-wire-receiving groove, and having a major part of its external surface opposite said groove curved convexly transversely of the insert to form a bearing area to rest on a mating support and to distribute to the support through the curved bearing surface thereof forces applied to said groove portion.

4. A current collector comprising a holder having a rigid metal body with a base portion and upwardly extending sides defining with the base a longitudinally extending open-ended bore having a transverse cross-section of substantially circular arc greater than 180 degrees and a longitudinal opening for a trolley wire above the bore and communicating therewith, and a substantially straight, elongated, solid, current collector insert of frangible material having a longitudinally extending trolley-wire-receiving groove, and having part of its external surface opposite said groove curved convexly transversely of the insert to form a bearing area to rest on a mating support in the bore and to distribute to the holder body through a curved bearing surface thereof forces applied to said groove portion.

References Cited in the file of this patent

UNITED STATES PATENTS

| Number | Name | Date |
|---|---|---|
| 1,548,422 | Moore | Aug. 4, 1925 |
| 1,841,552 | Schaake | Jan. 19, 1932 |
| 2,169,154 | Lapham | Aug. 8, 1939 |
| 2,185,257 | Larsson | Jan. 2, 1940 |
| 2,185,269 | Ryan | Jan. 2, 1940 |
| 2,416,830 | Heuberger | Mar. 4, 1947 |

FOREIGN PATENTS

| Number | Country | Date |
|---|---|---|
| 559,129 | Great Britain | Feb. 4, 1944 |
| 567,060 | Great Britain | Jan. 25, 1945 |